(12) United States Patent
Ahn et al.

(10) Patent No.: US 11,463,655 B2
(45) Date of Patent: Oct. 4, 2022

(54) MEDIATION METHOD AND COMPUTER READABLE RECORDING MEDIUM

(71) Applicant: Hyperconnect Inc., Seoul (KR)

(72) Inventors: Sang Il Ahn, Cheongju-si (KR); Yongje Lee, Seoul (KR); Wonseob Jang, Seoul (KR)

(73) Assignee: Hyperconnect Inc., Seoul (KR)

( * ) Notice: Subject to any disclaimer, the term of this patent is extended or adjusted under 35 U.S.C. 154(b) by 0 days.

(21) Appl. No.: 17/189,450

(22) Filed: Mar. 2, 2021

(65) Prior Publication Data

US 2021/0281801 A1 Sep. 9, 2021

(30) Foreign Application Priority Data

Mar. 3, 2020 (KR) .......................... 10-2020-0026821

(51) Int. Cl.
*H04N 7/14* (2006.01)
*H04L 65/1069* (2022.01)
*H04L 65/80* (2022.01)

(52) U.S. Cl.
CPC ......... *H04N 7/147* (2013.01); *H04L 65/1069* (2013.01); *H04L 65/80* (2013.01)

(58) Field of Classification Search
USPC ...................................................... 348/14.07
See application file for complete search history.

(56) References Cited

U.S. PATENT DOCUMENTS

| 8,514,265 | B2 * | 8/2013 | Goyal | H04N 21/4788 715/755 |
| 2006/0087553 | A1 * | 4/2006 | Kenoyer | H04N 7/152 348/E7.084 |
| 2013/0100228 | A1 * | 4/2013 | Tapia | H04N 21/26216 348/14.01 |
| 2013/0242033 | A1 * | 9/2013 | Kato | H04L 12/1827 348/14.08 |
| 2013/0271560 | A1 * | 10/2013 | Diao | H04L 12/1827 348/14.08 |

(Continued)

FOREIGN PATENT DOCUMENTS

| CN | 104980411 A | 10/2015 |
| CN | 108881780 A | 11/2018 |

(Continued)

OTHER PUBLICATIONS

Extended European Search Report for European Application No. 21160286.7, Search completed Mar. 30, 2021, dated Apr. 19, 2021, 9 Pgs.

(Continued)

*Primary Examiner* — Amal S Zenati
(74) *Attorney, Agent, or Firm* — KPPB LLP

(57) ABSTRACT

Provided are a mediation method and a computer-readable recording medium. A mediation method according to an example embodiment of the present disclosure includes establishing one video call session between a plurality of terminals, receiving videos obtained from each of the plurality of terminals, analyzing characteristics of the video call session, and in response to the analysis result, determining respective qualities of videos to be transmitted to each of the plurality of terminals. The plurality of terminals includes one host terminal and at least one guest terminal.

12 Claims, 8 Drawing Sheets

(56) References Cited

U.S. PATENT DOCUMENTS

2015/0222855 A1    8/2015  Kato
2017/0085600 A1*   3/2017  Carter ................. H04L 65/1089

FOREIGN PATENT DOCUMENTS

| EP | 3481058 A1 | 5/2019 |
|----|------------|--------|
| JP | 2012217124 A | 11/2012 |
| KR | 10-2011-0004972 A | 1/2011 |
| KR | 10-2014-0055252 A | 5/2014 |
| KR | 10-2014-0058225 A | 5/2014 |

OTHER PUBLICATIONS

Japanese Patent Application No. 2021-032624, Office Action dated Feb. 7, 2022, 3 pgs.

* cited by examiner

MEDIATION METHOD AND COMPUTER READABLE RECORDING MEDIUM

CROSS-REFERENCE TO RELATED APPLICATION

This application is based on and claims priority from Korean Patent Application No. 10-2020-0026821 filed on Mar. 3, 2020 in the Korean Intellectual Property Office, the disclosure of which is incorporated by reference herein in its entirety.

BACKGROUND

The following descriptions relate to a mediation method and a computer-readable recording medium, and more specifically, to a mediation method for independently controlling video quality corresponding to a plurality of divided areas of a video call or an online broadcasting channel and a computer-readable recording medium.

With the development of communication technology and miniaturization of electronic devices, personal terminals are widely distributed to general consumers. In particular, portable personal terminals such as smartphones or smart tablets have been recently widespread.

Most of the portable personal terminals have a communication function, so they can be connected to a communication network to exchange data with other terminals. For example, they can exchange videos and audios with other terminals.

Video calls or online broadcasts may be made between a plurality of terminals using such a function. As the number of participating terminals increases in a limited network environment, a failure may occur in smooth service use.

SUMMARY

The present disclosure aims to provide a mediation method and a computer-readable recording medium capable of providing a smooth service when a plurality of terminals consume the same content in a limited network environment.

According to an aspect, there is provided a mediation method including establishing one video call session between a plurality of terminals, receiving videos obtained from each of the plurality of terminals, analyzing characteristics of the video call session, and in response to the analysis result, determining respective qualities of videos to be transmitted to each of the plurality of terminals. The plurality of terminals includes one host terminal and at least one guest terminal.

In addition, the quality of the video corresponding to the guest terminal other than the host terminal may be determined in determining respective qualities of videos, and the characteristics of the video call session may include at least one of a status of a network in which the video call session is provided, duration of a video call of the guest terminal, a specification of the guest terminal, and a popularity corresponding to a user of the guest terminal.

Further, when a bandwidth of the network in which the video call session is provided is less than a predetermined value corresponding to a number of terminals connected to the video call session, the quality of the video may be determined in proportion to the popularity corresponding to a user of the guest terminal, the duration of a video call, or the specification of the terminal in determining respective qualities of videos.

Moreover, the method may further include transmitting video to each terminal in response to the determined quality. The quality may be determined independently for the video obtained from each terminal in determining respective qualities of videos.

In addition, the guest terminal includes a first guest terminal and a second guest terminal, the quality of the video to be transmitted is determined for each video obtained from the first and second guest terminals in determining respective qualities of videos, and the video obtained from the host terminal and the videos obtained from the first and second guest terminals may be transmitted to the host terminal and the first and second guest terminals in response to the determined quality of the video in transmitting the video.

Further, a plurality of videos with different qualities may be received from each of the plurality of terminals in receiving videos.

According to another aspect, there is provided a mediation method including opening an online broadcasting channel in response to a request of a host terminal, transmitting a video obtained by the host terminal through the channel in real time, allowing at least one viewer terminal to connect to the channel, selecting at least one first guest terminal among the viewer terminals and transmitting a video obtained by the first guest terminal through the channel in real time; and analyzing characteristics of the channel and determining a quality of a video to be transmitted through the channel in response to the analysis result.

In addition, the videos obtained from the host terminal and the first guest terminal may be displayed on divided areas of displays of respective terminals connected to the channel, and the quality of the video corresponding to the terminal other than the host terminal may be determined in determining a quality of a video.

Moreover, the characteristics of the channel may include at least one of a status of a network to which the channel is connected, connection duration of each terminal to the channel, a specification of the terminal connected to the channel, and a popularity corresponding to a user of the first guest terminal.

Further, the host terminal and the first guest terminal may provide a plurality of videos with different qualities.

In addition, the method may further include selecting at least one second guest terminal among the plurality of viewer terminals and transmitting a video obtained by the second guest terminal through the channel in real time.

Moreover, the respective qualities of the videos to be transmitted are determined for the videos obtained from the first and second guest terminals in determining a quality of a video, and the method may further include transmitting the videos obtained from the host terminal and the first and second guest terminals through the channel in response to the determined qualities of the videos.

According to yet another aspect, there is provided a computer-readable recording medium on which a program for performing the method according to the present disclosure is recorded may be provided. The present disclosure may provide a mediation method and a computer-readable recording medium capable of providing a smooth service when a plurality of terminals consume the same content in a limited network environment.

DETAILED DESCRIPTION

Figure 1:
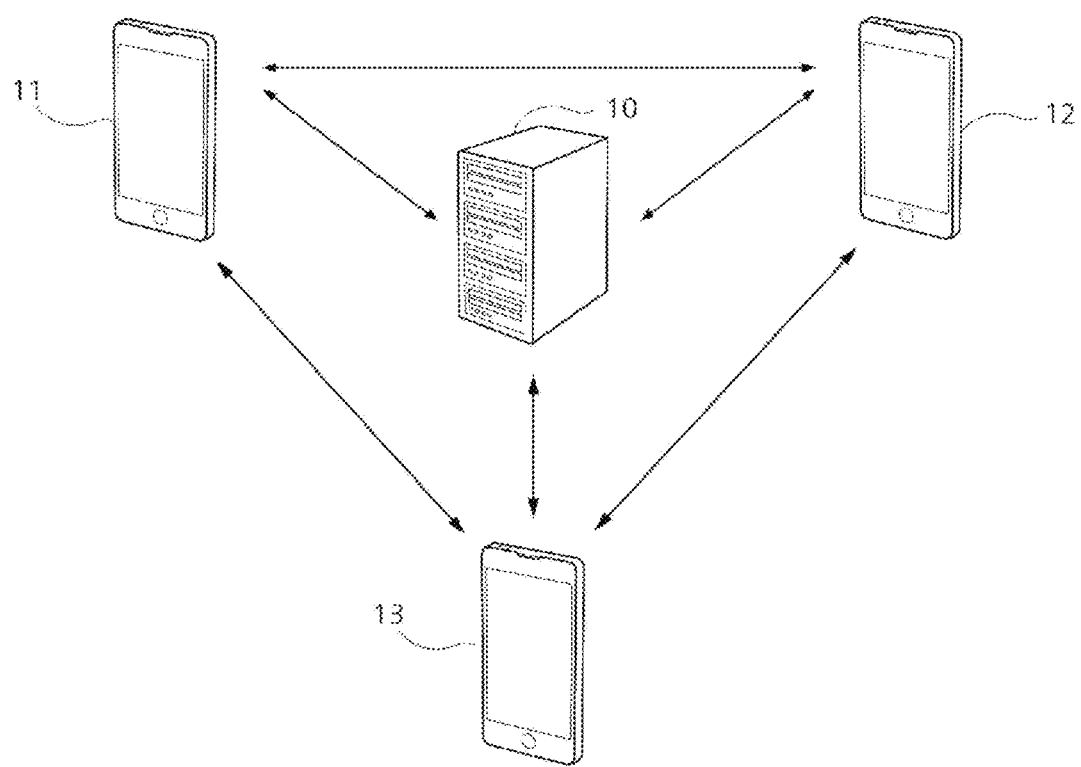
FIG. 1 is a diagram illustrating an environment in which the present disclosure may be practiced.

Advantages and features of the present disclosure, and a method of achieving them will become apparent with reference to the example embodiments described below in detail together with the accompanying drawings. The present disclosure may, however, be embodied in many different forms and should not be construed as being limited to the example embodiments set forth herein. Rather, these example embodiments are provided so that this disclosure will be thorough and complete and will fully convey the concept of the disclosure to those skilled in the art, and the present disclosure will only be defined by the appended claims. Like reference numerals refer to like elements throughout the specification.

Although "first" or "second" is used to describe various components, these components are not limited by the terms as described above. The terms as described above may be used only to distinguish one component from another component. Therefore, the first component mentioned below may be the second component within the technical idea of the present disclosure.

The terms used in the present specification are for explaining example embodiments and are not intended to limit the present disclosure. In this specification, the singular form also includes the plural form unless specifically stated in the phrase. As used in the specification, "comprises" or "comprising" is implied that the recited component or operation does not exclude the presence or addition of one or more other components or operations.

Unless otherwise defined, all terms used in this specification may be interpreted as meanings that can be commonly understood by those skilled in the art to which the present disclosure pertains. In addition, terms defined in a commonly used dictionary are not interpreted ideally or excessively unless explicitly defined specifically.

FIG. 1 is a diagram illustrating an environment in which the present disclosure may be practiced. Referring to FIG. 1, the environment in which a first terminal 11, a second terminal 12, and a third terminal 13 operate may include a server 10, and the first terminal 11, the second terminal 12, and the third terminal 13 connected to the server 10 and to each other. For convenience of explanation, only three terminals, that is, the first terminal 11, the second terminal 12, and the third terminal 13, are shown in FIG. 1, but a larger number of terminals than three may be included. With respect to terminals that may be added, descriptions of the first terminal 11, the second terminal 12, and the third terminal 13 may be applied, except for the description to be specifically mentioned.

The server 10 may be connected to a communication network. The server 10 may be connected to other external devices through the communication network. The server 10 may transmit data to or receive data from other devices connected to each other.

The communication network connected to the server 10 may include a wired communication network, a wireless communication network, or a complex communication network. The communication network may include a mobile communication network such as 3G, LTE, or LTE-A. The communication network may include a wired or wireless communication network such as Wi-Fi, UMTS/GPRS, or Ethernet. Communication networks may include a local area communication network such as Magnetic Secure Transmission (MST), Radio Frequency Identification (RFID), Near Field Communication (NFC), ZigBee, Z-Wave, Bluetooth, Bluetooth Low Energy (BLE), or infrared communication (IR). The communication network may include a local area network (LAN), a metropolitan area network (MAN), or a wide area network (WAN).

The server 10 may be connected to at least one of the first terminal 11, the second terminal 12, and the third terminal 13 through a communication network. When the server 10 is connected to the first terminal 11 with each other, the server 10 may exchange data with the first terminal 11 through the communication network. When the server 10 is connected to the second terminal 12 with each other, the server 10 may exchange data with the second terminal 12 through the communication network. When the server 10 is connected to the third terminal 13 with each other, the server 10 may exchange data with the third terminal 13 through the communication network.

The server 10 may receive data from at least one of the first terminal 11, the second terminal 12, and the third terminal 13. The server 10 may perform an operation using data received from at least one of the first terminal 11, the second terminal 12, and the third terminal 13. The server 10 may transmit the operation result to at least one of the first terminal 11, the second terminal 12, and the third terminal 13.

The server 10 may receive a video call mediation request from a plurality of terminals among the first terminal 11, the second terminal 12, and the third terminal 13. The server 10 may select a plurality of terminals that have transmitted the mediation request. For example, the server 10 may select the first terminal 11 and the second terminal 12 among the first terminal 11, the second terminal 12, and the third terminal 13.

The server 10 may mediate a video call connection between the selected first terminal 11 and second terminal 12. For example, the server 10 may transmit connection information for the first terminal 11 to the second terminal 12. As another example, the server 10 may transmit connection information for the second terminal 12 to the first terminal 11.

The connection information for the first terminal 11 may include, for example, an IP address and a port number of the first terminal 11. Upon receiving the connection information for the second terminal 12, the first terminal 11 may attempt to connect to the second terminal 12 using the received connection information.

When the connection attempt of the first terminal 11 to the second terminal 12 or of the second terminal 12 to the first terminal 11 is successful, a video call session between the first terminal 11 and the second terminal 12 may be established. The first terminal 11 may transmit video or sound to the second terminal 12 through the video call session. The first terminal 11 may encode video or sound into digital signals and transmit the encoded result to the second terminal 12.

In addition, the first terminal 11 may receive video or sound from the second terminal 12 through the video call session. The first terminal 11 may receive video or sound encoded as digital signals, and decode the received video or sound.

The second terminal 12 may transmit video or sound to the first terminal 11 through the video call session. In addition, the second terminal 12 may receive video or sound from the first terminal 11 through the video call session. Accordingly, a user of the first terminal 11 and a user of the second terminal 12 can make a video call with each other.

The first terminal 11, the second terminal 12, and the third terminal 13 may be, for example, a desktop computer, a laptop computer, a smartphone, a smart tablet, a smart watch, a mobile terminal, a digital camera, a wearable device, or a portable electronic device. The first terminal 11, the second terminal 12, and the third terminal 13 can execute a program or application. Each of the first terminal 11, the second terminal 12, and the third terminal 13 may be the same type of device or a different type of device.

Figure 2:
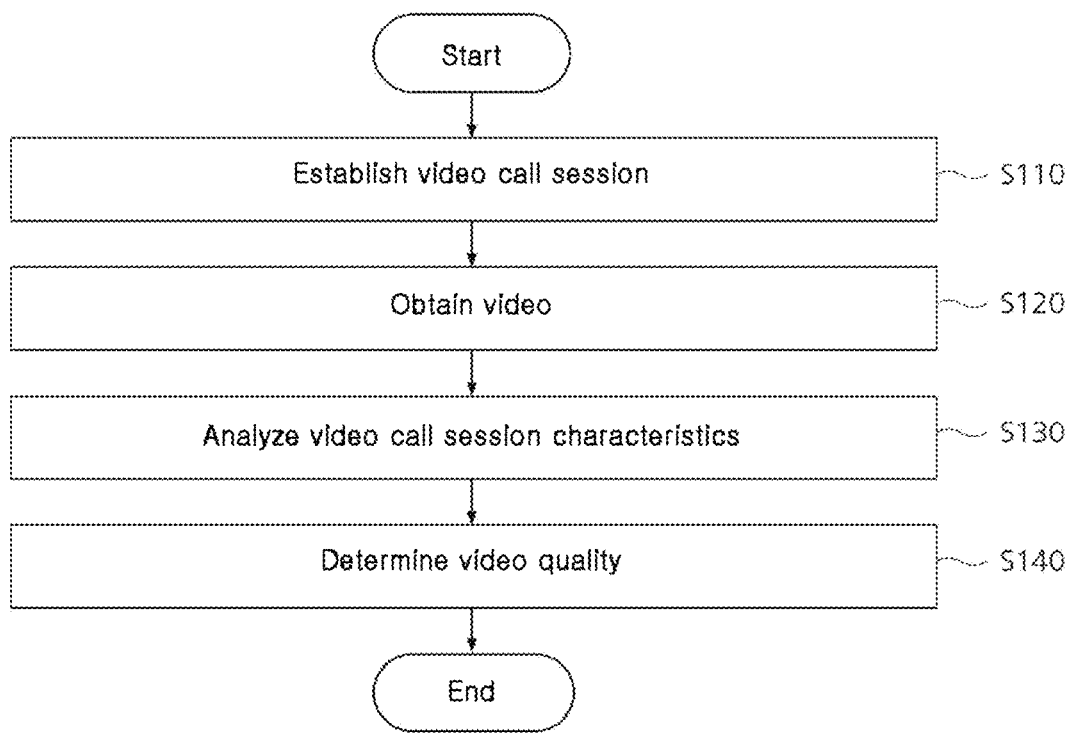
FIG. 2 is a flowchart schematically illustrating a mediation method according to an example embodiment of the present disclosure.

FIG. 2 is a flowchart schematically illustrating a mediation method according to an example embodiment of the present disclosure. Referring to FIG. 2, a mediation method according to an example embodiment of the present disclosure includes operation S110 for establishing a video call session, operation S120 for obtaining a video, operation S130 for analyzing characteristics of the video call session, and operation S140 for determining the quality of the video.

In operation S110, one video call session is established between a plurality of terminals. Each of the plurality of terminals may be a desktop computer, a laptop computer, a smartphone, a smart tablet, a smart watch, a mobile terminal, a digital camera, a wearable device, or a portable electronic device, like the terminals 11, 12, and 13 described with reference to FIG. 1.

In addition, a computer program or an application for performing a video call may be installed in the plurality of terminals. The video call session may be established between two or more terminals, and a display user interface (UI) of the same type may be displayed on the plurality of terminals connected to the video call session.

In operation S120, videos obtained by each of the plurality of terminals are received. For example, when the video call session is established between the first terminal to the third terminal, the videos may be received from the first terminal to the third terminal. Each terminal may include an imaging device that obtains a video, for example, each terminal may have a front camera capable of obtaining a video of the front side of the terminal, a rear camera capable of obtaining a video of the rear side of the terminal, and/or a side camera capable of obtaining a video of the lateral side of the terminal.

In operation S120, all videos obtained through all imaging devices provided in each terminal or videos obtained through some imaging devices may be received. The video received in operation S120 may be the video selected by a user of each terminal. For example, when the user of the terminal selects to transmit only the video obtained through the front camera, the videos obtained through the rear camera and the side camera may not be received in operation S120.

Alternatively, if the user of the terminal selected to transmit all the videos obtained through the front camera, the rear camera, and the side camera, all videos obtained through the terminal may be received in operation S120.

In an example embodiment of the present disclosure, a plurality of videos with different qualities may be received from each of the plurality of terminals in operation S120. For example, when a video is received from the first terminal, the same video obtained through the first terminal may be transmitted as a plurality of videos with different qualities. If the first terminal can obtain videos with qualities of 1080p, 720p, and 480p, the same video obtained through the first terminal may be transmitted in three quality types of 1080p, 720p, and 480p. In this case, it may be understood that the first terminal can obtain a video of at least maximum of 1080p.

In the above example, it has been described that videos of quality corresponding to 1080p, 720p, and 480p are received, but the present disclosure is not limited by the above resolution, and a higher quality video or a lower quality video may also be received.

In operation S130, characteristics of the video call session are analyzed. Here, the characteristics of the video call session may include a status of the network in which the video call session is provided. In addition, in an example embodiment, the characteristics of the video call session may include additional information related to the video call session, which may include at least one of a duration of the video call of each of the plurality of guest terminals and a popularity corresponding to a user of each terminal. Moreover, the characteristics of the video call session may include a specification of each of the plurality of terminals.

Meanwhile, in an example embodiment, at least one of a video call session and a terminal may be selected based on the additional information related to the video call session, and, for example, the priority of each video call session or each of the plurality of terminals may be determined based on the additional information related to the video call session.

The status of the network may mean a bandwidth allocated to the network, a traffic status of the network, and the like. The size of the bandwidth allocated to one video call session may be predetermined, and the transmission speed may decrease as the number of connected terminals increases. For example, the transmission speed may be slower when five terminals are connected than when three terminals are connected to one video call session.

The video call duration can be understood as duration from the time each terminal connected to the video call session participated in the video call session to the present time. In the above example, the first to third terminals may start a video call at the same time, or the third terminal may participate the video call session with a certain time difference after the first and second terminals started the video call. Therefore, the video call duration may be different for each terminal.

The specification of the terminal may mean a hardware and software capability of the terminal. In addition, the popularity can be understood as the degree of reputation or favorability that a user of each terminal obtains from other users.

The popularity corresponding to the user of each terminal may correspond to a reputation received from users of other terminals who have made a video call with the terminal. For example, when the second terminal performs a video call with other terminals, users of the other terminals may evaluate the video call experience with the user of the second terminal. The evaluation method may be a qualitative evaluation for rating as bad, normal, good, etc., or a quantitative evaluation for selecting any one of 1 to 10 points.

In operation S140, the quality of the video to be transmitted to each of the plurality of terminals is determined in response to the analysis result in operation S130. The quality of the video to be transmitted through the video call session may be predetermined. For example, after the video call session is established, a 1080p video may be transmitted to all of the first to third terminals. Accordingly, the 1080p videos transmitted from the first to third terminals may be transmitted to the first terminal, and the 1080p videos transmitted from the first to third terminals may also be transmitted to the second terminal. In addition, the 1080p videos transmitted from the first to third terminals may also be transmitted to the third terminal.

In operation S140, a quality of a video to be transmitted to each terminal may be newly determined in consideration of the analysis result in operation S130 separately from the predetermined video quality. For example, if it is determined that the size of the bandwidth allocated to the video call session is not sufficient to transmit a 1080p video to all of the first to third terminals, it may be determined to transmit a video of a quality lower than 1080p to at least one of the first to third terminals.

At this time, in order to determine a terminal to receive a low-quality video, at least one of the video call duration, and the user's popularity may be considered. In addition, in order to determine a terminal to receive a video with a low quality, the terminal specification may further be considered.

In an example embodiment of the present disclosure, a terminal to receive a low-quality video may be determined as a terminal having a short video call duration, a terminal having a low specification, and a terminal of a user having low popularity.

Meanwhile, the plurality of terminals include one host terminal and at least one guest terminal. The host terminal may be understood as a terminal that has requested to establish a video call session between the plurality of terminals. In addition, the guest terminal may mean a terminal other than the host terminal among terminals participating in the video call.

The video call session may be terminated when the connection of the host terminal is disconnected, and the guest terminal may be added or deleted while the video call session is maintained.

In an example embodiment of the present disclosure, a quality of a video corresponding to the guest terminal other than the host terminal may be determined in operation S140. Accordingly, even if the status of the network becomes unstable or the number of terminals exceeding the limit that the network can accommodate are connected, the quality of the video to be transmitted to the host terminal may not be changed.

Figure 3:
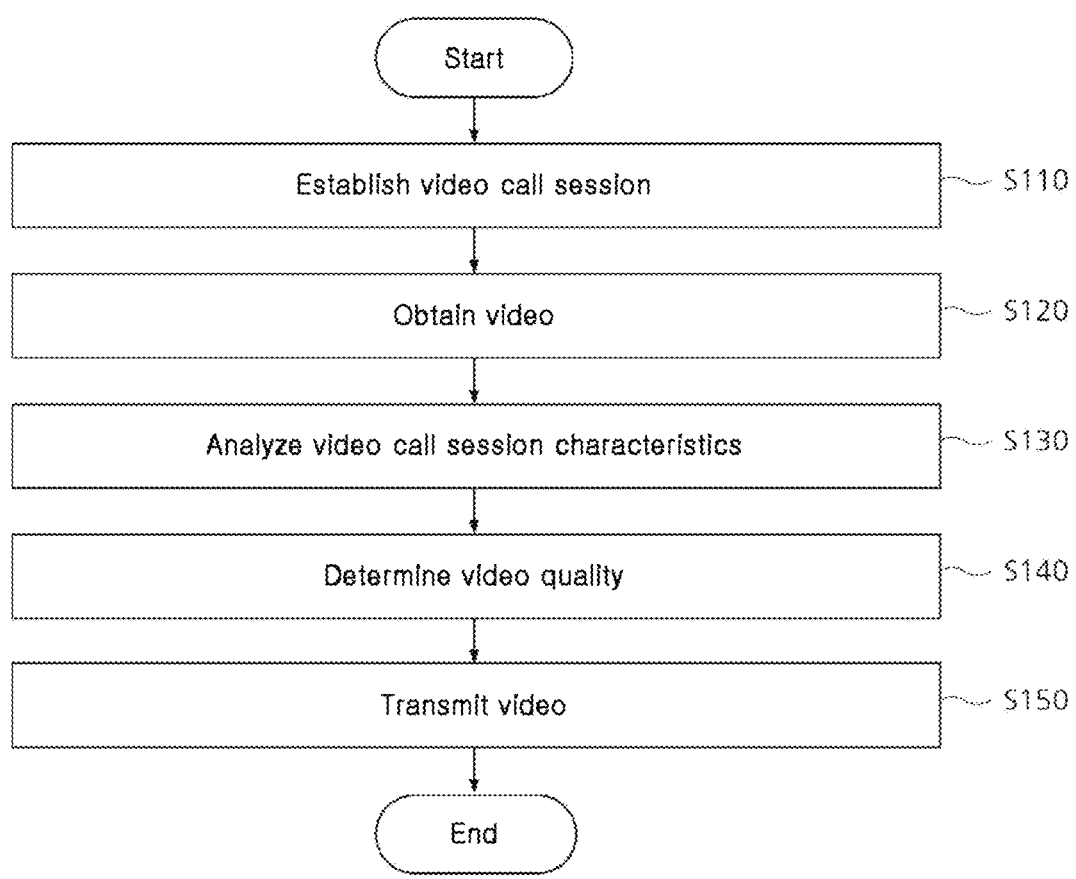
FIG. 3 is a diagram schematically showing a mediation method according to another example embodiment of the present disclosure.

FIG. 3 is a diagram schematically showing a mediation method according to another example embodiment of the present disclosure. Referring to, FIG. 3, a mediation method according to another example embodiment of the present disclosure further includes operation S150 for transmitting a video.

In operation S150, a video is transmitted to each terminal in response to the quality determined in operation S140. In addition, the quality of the video may be independently determined for the video obtained from each terminal in operation S140. For example, when the quality of the video to be transmitted to the third terminal is determined as 480p, the quality of the video to be transmitted to the second terminal need not to be determined as 480p. Accordingly, the quality of the video to be transmitted to the second terminal may be independently determined with respect to the quality of the video to be transmitted to the third terminal.

When a video is transmitted in operation S150, each terminal that has received the video may display the video obtained from the plurality of terminals through a display device. For example, the first terminal displays both the video obtained from the second and third terminals and the video obtained from the first terminal.

The first terminal may be defined as a host terminal, and the second and third terminals may be defined as a first guest terminal and a second guest terminal, respectively. In this case, the quality of a video to be transmitted may be determined for the videos obtained from the first and second guest terminals, respectively, in operation S140.

And, in operation S150, the video obtained from the host terminal and the videos obtained from the first and second guest terminals may be transmitted to the host terminal and the first and second guest terminals in response to the determined video quality.

Figure 4:
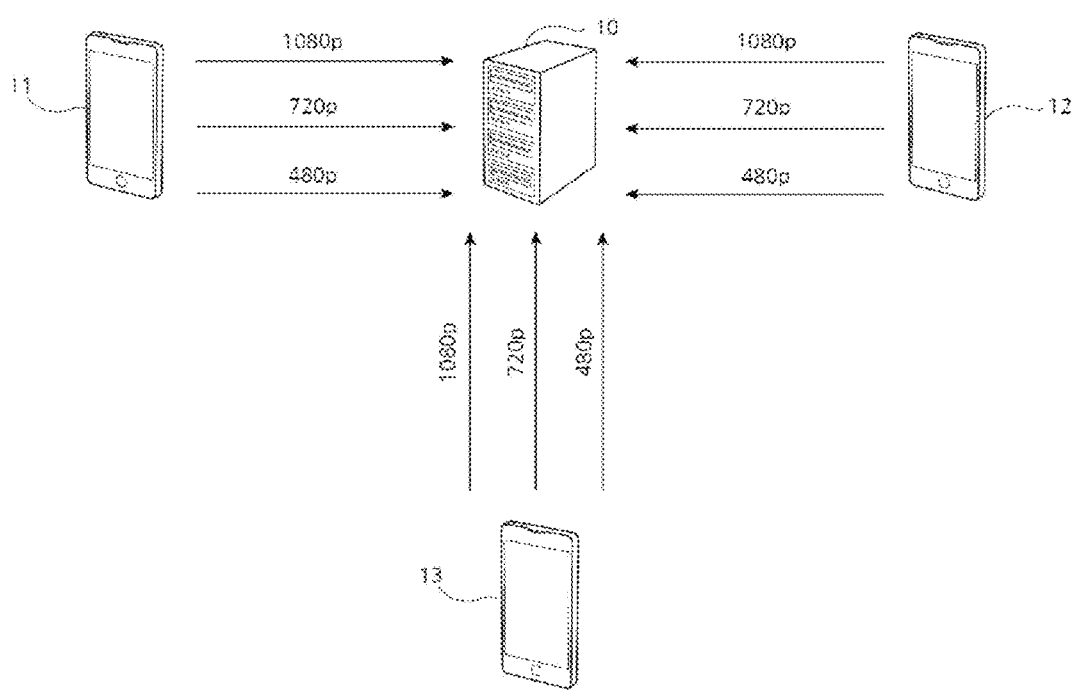
FIG. 4 is a diagram illustrating a method of transmitting data by a plurality of terminals by a mediation method according to the present disclosure.

FIG. 4 is a diagram illustrating a method of transmitting data by a plurality of terminals by a mediation method according to the present disclosure.

Referring to FIG. 4, a method of transmitting data to a server 10 by a plurality of terminals 11, 12, and 13 is illustrated as an example. As described with reference to FIG. 2, the plurality of terminals 11, 12, and 13 can transmit videos with different qualities, and videos having resolutions of 1080p, 720p, and 480p may be transmitted to the server 10.

In the present specification, it is described that the plurality of terminals 11, 12, and 13 can transmit videos having three different qualities of 1080p, 720p, and 480p, but the present disclosure is not necessarily limited thereto. Accordingly, the plurality of terminals 11, 12, and 13 may transmit two videos having different qualities, four or five videos having different qualities, or a larger number of videos having different qualities to the server 10.

The videos having different qualities are taken of the same scene, and it can be understood that all other factors except for the video quality are the same. For example, a video of a user of the first terminal 11 obtained by the first terminal 11 may be transmitted with three different qualities.

Here, the first terminal 11 may be defined as a host terminal, the second terminal 12, and the third terminal 13 as a first guest terminal and a second guest terminal, respectively.

When a video call session is established between the plurality of terminals 11, 12, and 13, the server 10 returns the videos obtained from the plurality of terminals 11, 12, and 13 to the plurality of terminals 11, 12, and 13. In an example embodiment, the quality of the video to be transmitted may be determined in advance to be 1080p, and when the status of the network is changed, a video having a quality different from the predetermined quality may be transmitted.

At this time, since the first terminal 11 is a host terminal, the quality of the video to be transmitted to the first terminal 11 does not change even if the network status is changed, and only the quality of the video to be transmitted the second terminal 12 or the third terminal 13 can be changed.

For example, when transmitting a video of low quality to the third terminal 13, a 720p video obtained from the first terminal 11, a 720p video obtained from the second terminal 12, and a 720p video obtained from the third terminal 13 may be transmitted to the third terminal 13. Alternatively, a 1080p video obtained from the first terminal 11, a 1080p video obtained from the second terminal 12, and a 720p video obtained from the third terminal 13 may be transmitted to the third terminal 13.

That is, the quality of a plurality of videos to be transmitted to the plurality of terminals 11, 12, and 13 may be independently determined from each other in consideration of the status of the network in which the video call session is provided.

Figure 5:
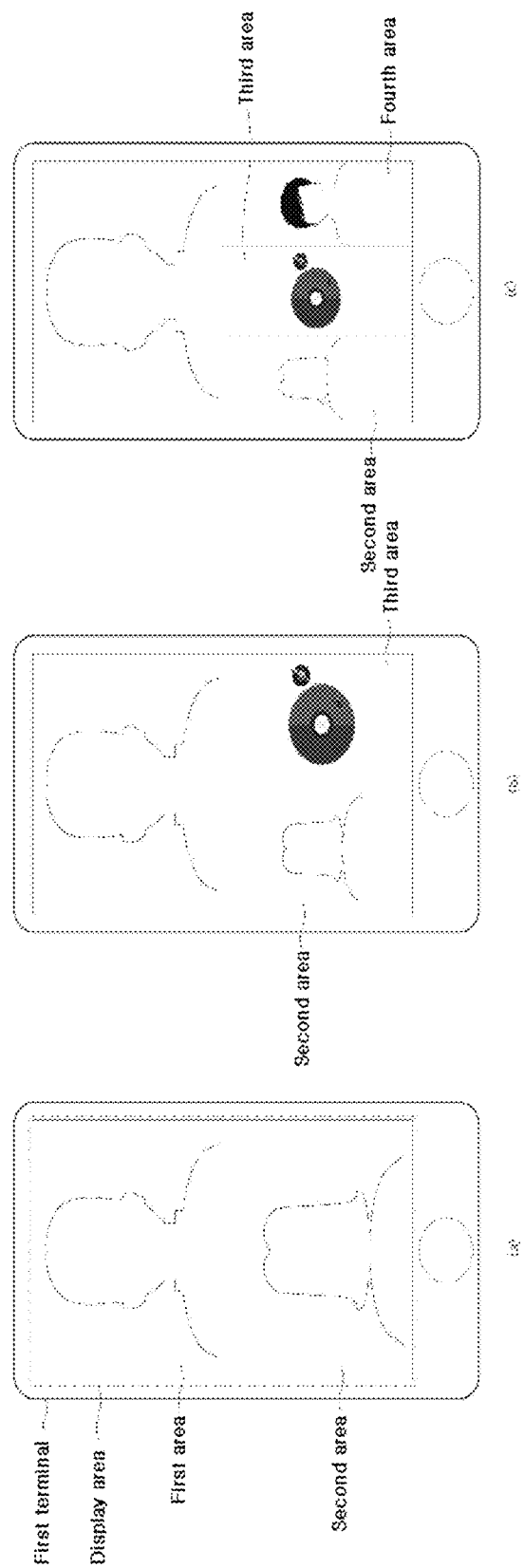
FIG. 5 is a diagram illustrating a method of displaying a video by a mediation method according to the present disclosure.

FIG. 5 is a diagram illustrating a method of displaying a video by a mediation method according to the present disclosure. FIGS. 5A to 5C exemplarily show cases where a video call session is established between two terminals, three terminals, and four terminals, respectively.

First, referring to FIG. 5A, a screen displayed on the first terminal is shown when a video call session is established between two terminals. For convenience of explanation, a terminal connected to the first terminal through the video call session will be defined as a second terminal. The first terminal may include a display device, and the display device may display videos obtained by the first terminal and the second terminal through a display area. In FIG. 5A, a first area and a second area are included in the display area, and a video obtained from the first terminal and a video obtained from the second terminal may be displayed in the first area and the second area, respectively. Alternatively, a video obtained from the second terminal and a video obtained from the first terminal may be displayed in the first area and the second area, respectively.

Here, the first terminal may be defined as a host terminal, and the second terminal may be defined as a guest terminal. The host terminal may be understood as a terminal requesting a video call with the guest terminal, and the guest terminal may be understood as a terminal responding to the request. Alternatively, the guest terminal may be a terminal selected by the host terminal among a plurality of terminals requesting a video call with the host terminal.

FIG. 5B illustrates a screen displayed on a first terminal when a video call session is established between three terminals. The three terminals may be the first terminal, a second terminal, and a third terminal.

Referring to FIG. 5B, an area defined as the second area in FIG. 5A is re-defined as a second area and a third area. A video obtained by the second terminal may be displayed in the second area, and a video obtained by the third terminal may be displayed in the third area. The third terminal is a terminal different from the first terminal and the second terminal.

In addition, the third terminal can be understood as a new guest terminal other than the second terminal, and the third terminal may be a terminal that participates in the video call session at the request of the host terminal or that is selected by the host terminal among a plurality of terminals requesting to participate in the video call session.

In FIG. 5B, the video displayed in the third area may be a video obtained by the third terminal and may be a video stored in the third terminal, a video on a web shared by the third terminal, or a video obtained by the imaging device of the third terminal.

Meanwhile, in FIG. 5B, it is shown that the sizes of the second area and the third area are substantially the same, but the present disclosure is not limited thereto. The sizes of the first area to the third area may be determined as preset values or may be determined by the host terminal.

FIG. 5C illustrates a screen displayed on a first terminal when a video call session is established between four terminals. The four terminals may be the first terminal, a second terminal, a third terminal, and a fourth terminal.

Referring to FIG. 5C, areas defined as the second area and the third area in FIG. 5B are re-defined as a second area, a third area, and a fourth area. A video obtained by the second terminal may be displayed in the second area, a video obtained by the third terminal may be displayed in the third area, and a video obtained by the fourth terminal may be displayed in the fourth area. The fourth terminal is a terminal different from the first terminal to the third terminal.

In addition, the fourth terminal can be understood as a new guest terminal other than the second terminal or the third terminal, and the fourth terminal may be a terminal that participates in the video call session at the request of the host terminal or that is selected by the host terminal among a plurality of terminals requesting to participate in the video call session.

Meanwhile, in FIG. 5C, it is shown that the sizes of the second area to the fourth area are substantially the same, but the present disclosure is not limited thereto. The sizes of the first area to the fourth area may be determined as preset values or may be determined by the host terminal.

Figure 6:
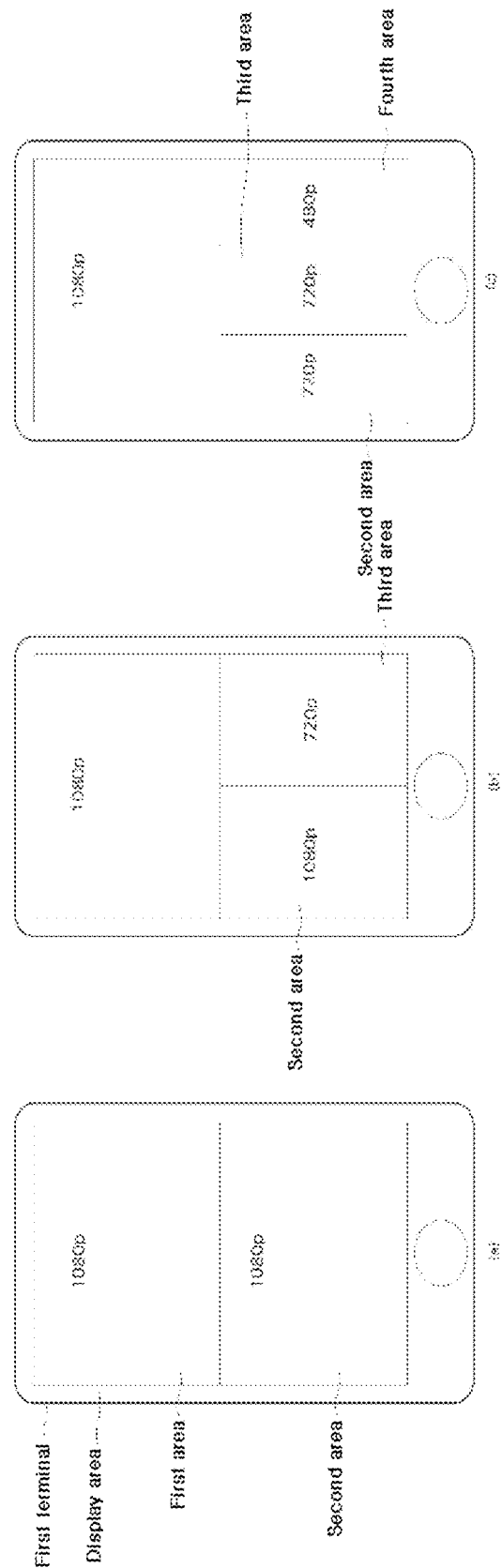
FIG. 6 is a diagram illustrating a method of displaying a video whose quality is determined by a mediation method according to the present disclosure.

FIG. 6 is a diagram illustrating a method of displaying a video whose quality is determined by a mediation method according to the present disclosure. Referring to FIG. 6, FIGS. 6A to 6C correspond to FIGS. 5A to 5C, respectively. Accordingly, it can be understood that videos obtained from first to fourth terminals are displayed in first to fourth areas of FIG. 6, respectively.

First, referring to FIG. 6A, when a video call session is established between a first terminal and a second terminal, both a video obtained from the first terminal and a video obtained from the second terminal may be displayed with a resolution of 1080p.

And, referring to FIG. 6B, when a video call session is established between a first terminal, a second terminal, and a third terminal, a video obtained from the first terminal and a video obtained from the second terminal may be displayed with a resolution of 1080p, and a video obtained from the third terminal may be displayed with a resolution of 720p.

As described with reference to FIGS. 2 to 4, each terminal can transmit the same video with different quality, and the server determines the quality of the video to be transmitted in consideration of the status of the network.

In FIG. 6, the third terminal can transmit videos having resolutions of 1080p, 720p, or 480p, and the server may select a video having a resolution of 720p among the videos obtained from the third terminal in consideration of the network status and transmit to the first terminal, the second terminal, and the third terminal.

Since the video obtained from the third terminal among the terminals connected to the video call session is transmitted with a lower quality than the videos obtained from other terminals, it can be understood that the status of the network, for example, the bandwidth of the network is not sufficient for a smooth video call between the three terminals.

In addition, since the video call duration of the third terminal is the shortest or the specification of the third terminal is lower than that of other terminals, it is possible to determine to transmit the video obtained from the third terminal with low quality. Alternatively, since the popularity of the user of the second terminal is higher than that of the user of the third terminal, it may be determined to transmit the video obtained from the third terminal with low quality.

As described above, in order to select a terminal to perform video transmission with low quality among the plurality of terminals, a corresponding terminal may be selected based on the priority of the terminal.

Further, referring to FIG. 6C, when a video call session is established between the first terminal, the second terminal, the third terminal, and the fourth terminal, a video obtained from the first terminal may be displayed with a resolution of 1080p, a video obtained from the second terminal and a video obtained from the third terminal may be displayed with a resolution of 720p, and a video obtained from the fourth terminal may be displayed with a resolution of 480p.

In FIG. 6, the fourth terminal can transmit videos having resolutions of 1080p, 720p, and 480p, similar to the third terminal, and the server may transmit to the first terminal, the second terminal, the third terminal, and the fourth terminal a video with a resolution of 480p among the videos obtained from the fourth terminal in consideration of the status of the network.

Since the video obtained from the fourth terminal among the terminals connected to the video call session is being transmitted with a lower quality than the videos obtained from other terminals, it can be understood that the status of the network, for example, the bandwidth of the network is not sufficient for a smooth video call between the four terminals.

In addition, since the video call duration of the fourth terminal is the shortest or the specification of the fourth terminal is lower than that of other terminals, it is possible to determine to transmit the video obtained from the fourth terminal with low quality. Alternatively, since the popularity of the user of the second terminal or the third terminal is higher than that of the user of the fourth terminal, it may be determined to transmit the video obtained from the fourth terminal with low quality.

Meanwhile, the video obtained from the second terminal may be displayed with a resolution of 720p instead of 1080p. This can be understood that the quality of the video has been lowered to satisfy the optimal transmission rate because one more terminal is participated in the video call session than in the case of FIG. 6B.

Moreover, if five terminals participate in a video call session, videos obtained from the second terminal and the third terminal may be transmitted with a lower resolution.

Figure 7:
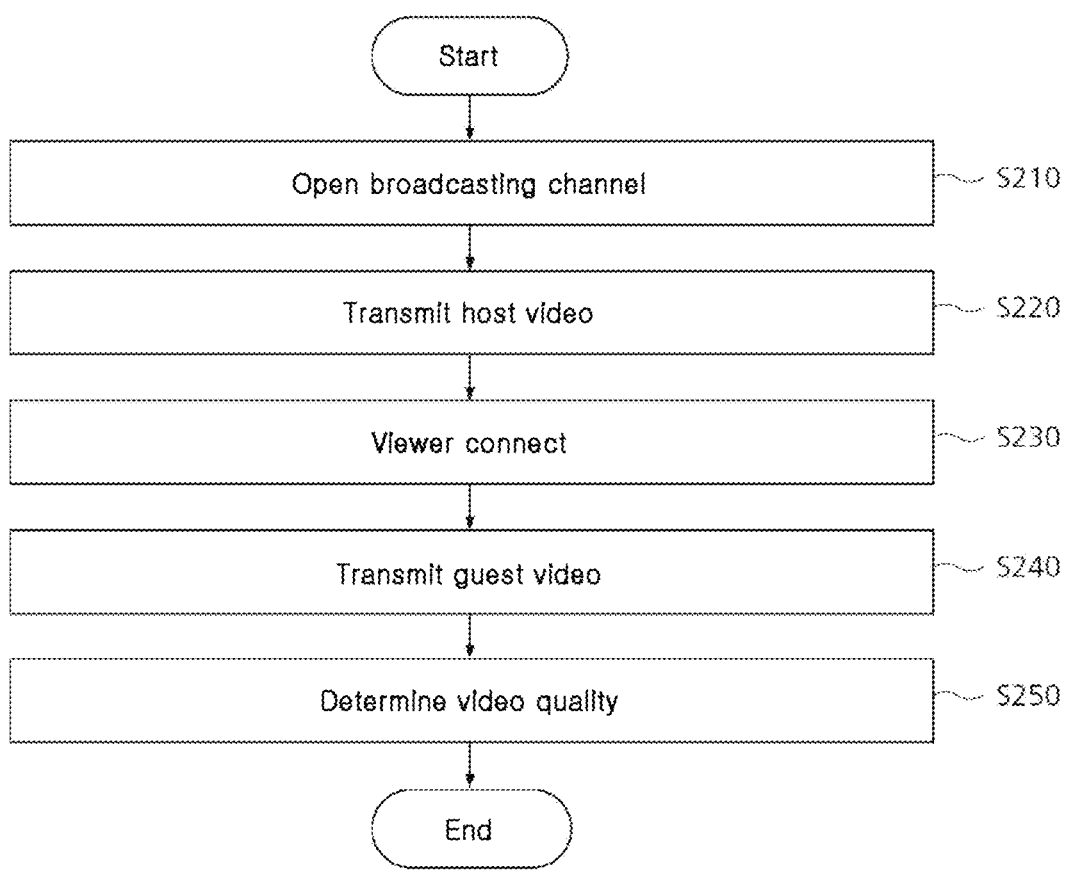
FIG. 7 is a flowchart schematically showing a mediation method according to another example embodiment of the present disclosure.

FIG. 7 is a flowchart schematically showing a mediation method according to another example embodiment of the present disclosure. Referring to FIG. 7, a mediation method according to another example embodiment of the present disclosure includes operation S210 for opening a broadcast channel, operation S220 for transmitting a host video, operation S230 for connecting a viewer, operation S240 for transmitting a guest video, and operation S250 for determining the quality of a video.

In operation S210, an online broadcasting channel is opened in response to a request of a host terminal. The host terminal refers to a terminal that opens and operates the online broadcasting channel, and arbitrary terminals can access the online broadcasting channel.

The host terminal can share content through the channel, and terminals connected to the channel can watch, listen to, or use the content shared by the host terminal. In addition, terminals connected to the channel can exchange data with each other.

In operation S220, a video obtained by the host terminal is transmitted through the channel in real time. The host terminal may include an imaging device, a recording device, and a display device, and may transmit a video obtained through the imaging device through the channel in real time. The video transmitted through the channel may be transmitted to terminals connected to the channel. In addition, the voice obtained through the recording device may be transmitted through the channel to terminals connected to the channel.

In addition, terminals connected to the channel can reproduce the video and audio through a display device and an audio playback device included in each terminal.

In operation S230, at least one viewer terminal accesses the channel. The viewer terminal may be any terminal, but the present disclosure is not limited thereto, and it may be a terminal allowed to access the channel by the host terminal.

A viewer terminal connected to the channel can watch and listen to the video and audio obtained from the host terminal, and it can exchange data with the host terminal or other viewer terminals.

In operation S240, at least one first guest terminal among the viewer terminals is selected, and a video obtained by the first guest terminal is transmitted through the channel in real time.

The number of the first guest terminals may be plural, and the first guest terminal may be a terminal that has requested to participate a guest terminal among the viewer terminals, or a terminal selected by the host terminal among terminals that have requested to participate.

When the first guest terminal is selected, a video obtained from the first guest terminal may be transmitted through the channel, and a voice obtained from the first guest terminal may also be transmitted through the channel. Accordingly, the viewer terminal can watch and listen to both the video and the audio obtained from the host terminal and the first guest terminal.

Videos obtained from the host terminal and the first guest terminal may be displayed on the viewer terminal, the host terminal, and the first guest terminal in a manner similar to that illustrated in FIGS. 5 and 6. That is, the videos obtained from the host terminal and the first guest terminal may be displayed on divided areas of a display of each terminal connected to the channel.

In operation S250, the characteristics of the channel are analyzed, and the quality of the video to be transmitted through the channel is determined in response to the analysis result. The characteristics of the channel may include a status of a network to which the channel is connected. Also, in an example embodiment, the characteristics of the channel may include additional information obtained by performing a channel connection, which may include at least one of a connection duration of each terminal to the channel and a popularity corresponding to a user of the first guest terminal. In addition, the characteristics of the channel may further include a specification of a terminal connected to the channel.

Meanwhile, in an example embodiment, at least one of a channel and a guest terminal may be selected based on the additional information obtained by performing a channel connection, and, for example, the priority of each channel or each of a plurality of guest terminals may be determined based on the additional information obtained by performing a channel connection.

The host terminal and the first guest terminal may provide a plurality of videos having different qualities. The plurality of videos are substantially the same video, and may be understood as videos having different quality, for example, different resolutions.

In operation S250, the characteristics of the channel may be analyzed, and if necessary, depending on the analysis result, it may be determined which of the videos of different qualities obtained from the host terminal and the first guest terminal to be transmitted.

Meanwhile, in an example embodiment of the present disclosure, at least one second guest terminal may be selected among the plurality of viewer terminals, and a video obtained by the second guest terminal may be transmitted through the channel in real time.

Like the host terminal and the first guest terminal, the second guest terminal may provide a plurality of videos having different qualities. In addition, in operation S250, the quality of a video to be transmitted may be determined for the video obtained by the second guest terminal.

At this time, in operation S250, the quality of a video corresponding to a terminal other than the host terminal may be determined. That is, in operation S250, the quality of the video corresponding to the first guest terminal and the second guest terminal may be determined, and the video obtained from the host terminal may be transmitted with a preset quality.

Figure 8:
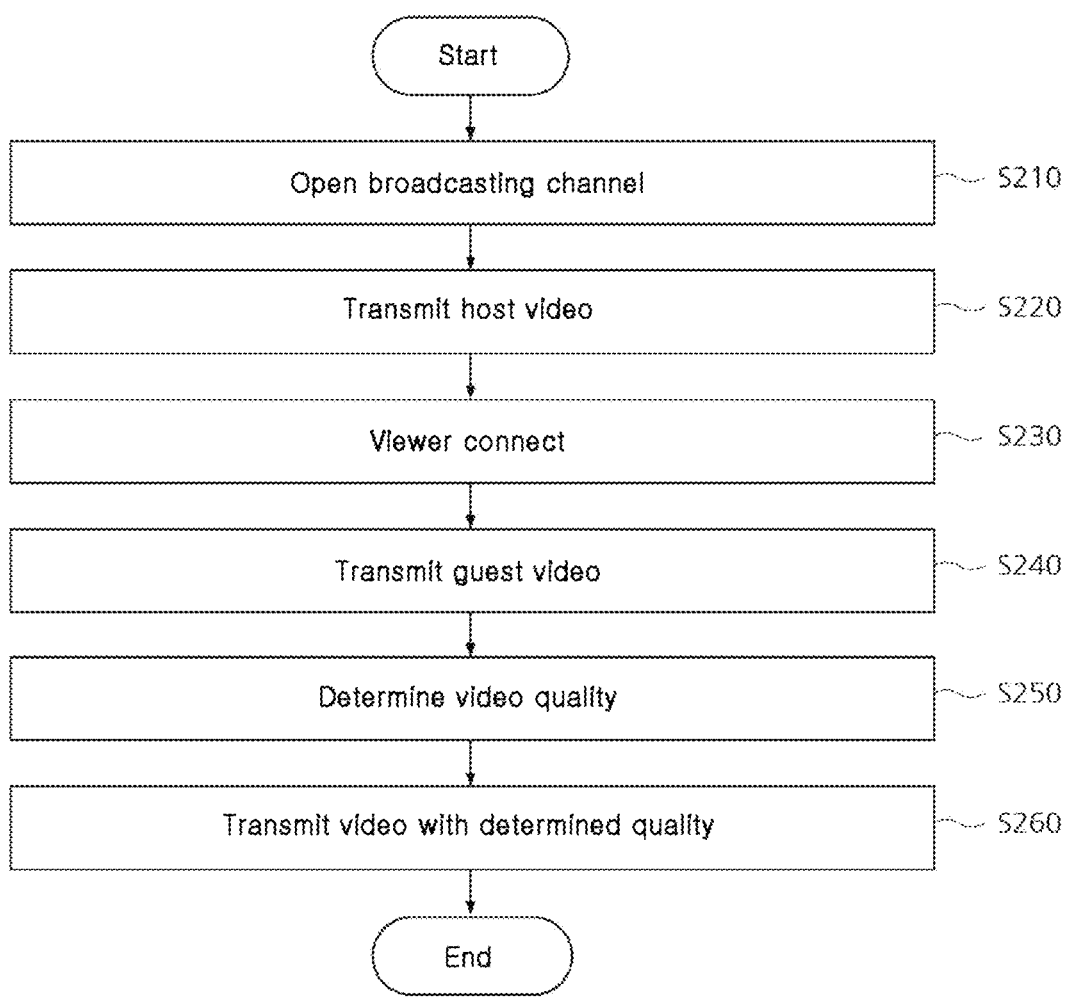
FIG. 8 is a flowchart schematically showing a mediation method according to yet another example embodiment of the present disclosure.

FIG. 8 is a flowchart schematically showing a mediation method according to another example embodiment of the present. Referring to FIG. 8, the mediation method according to another example embodiment of the present disclosure further includes operation S260 for transmitting a video with a determined quality.

In operation S260, a video obtained from the host terminal and the first and second guest terminals is transmitted in real time through the channel in response to the determined video quality.

The example embodiments described above may also be implemented in the form of a recording medium including instructions executable by a computer, such as a program module executed by a computer. Computer-readable media can be any available media that can be accessed by a computer, and can include both volatile and non-volatile media, and both removable and non-removable media.

Further, the computer-readable media may include computer storage media. Computer storage media may include both volatile and nonvolatile, and both removable and non-removable media implemented in any method or technology for storage of information such as computer readable instructions, data structures, program modules or other data.

Each of the server and the plurality terminals described in the above example embodiments may include or may be embodied as various numbers of hardware processors, software and/or firmware structures (collectively "components") that execute respective functions described above, according to an example embodiments. At least one of these components may be specifically embodied by a module, a program, or a part of code, which contains one or more executable instructions for performing specified logic functions, and executed by one or more microprocessors or other control apparatuses. Further, at least one of these components may include or may be implemented by a processor such as a central processing unit (CPU) that performs the respective functions, a microprocessor, or the like.

Although the example embodiments of the present disclosure have been described with reference to the accompanying drawings above, those skilled in the art to which the present disclosure pertains can understand that the present disclosure can be implemented in other specific forms without changing the technical spirit or essential features. Therefore, it should be understood that the example embodiments described above are illustrative and non-limiting in all respects.

What is claimed is:

1. A video call mediation method for a server mediating a video call session between a plurality of terminals, the method comprising:
   establishing, at a server, one video call session between the plurality of terminals wherein the plurality of terminals includes one host terminal and at least one guest terminal;
   receiving, using the server, a plurality of videos of varying qualities obtained from each of the plurality of terminals;
   analyzing, using the server, characteristics of each of the plurality of terminals and network characteristics;
     wherein the characteristics of a particular terminal includes at least one of: a connection duration of the particular terminal to the video call session and a popularity corresponding to a user of the particular terminal;
   in response to a result of the analysis, determining respective qualities of videos to be transmitted by the server to each of the plurality of terminals during the video call session,
     wherein the quality of each video to be transmitted is determined independently for each of the plurality of terminals; and
   transmitting, by the server to each of the plurality of terminals, the videos to be transmitted, wherein videos to be transmitted to a first terminal are transmitted at a determined quality for the first terminal and videos to be transmitted to a second terminal are transmitted at a determined quality for the second terminal.

2. The video call mediation method of claim 1, wherein, in determining respective qualities of videos, the first and second terminals are guest terminals other than the host terminal.

3. The video call mediation method of claim 1, wherein, in determining respective qualities of videos to be transmitted, when a bandwidth of a network in which the video call session is provided is less than a value corresponding to a number of terminals connected to the video call session, the quality of a video to be transmitted is determined by the server based on at least one of the popularity corresponding to a user of the particular terminal and the connection duration of a video call.

4. The video call mediation method of claim 1,
   wherein, in determining respective qualities of videos independently for each of the plurality of terminals, the determined qualities of one or more videos is predetermined by the server.

5. A non-transitory computer-readable recording medium on which a program for performing the method according to claim 1 is recorded.

6. A server for a video call mediation comprising at least one processor which is configured to:
   receive a video call mediation request from a plurality of terminals;
   select at least two terminals from the plurality of terminals that transmitted the mediation request, wherein the selected terminals include one host terminal and at least one guest terminal;
   establish one video call session between the selected terminals;
   receive a plurality of videos of varying qualities obtained from each of the selected terminals;
   analyze characteristics of each of the plurality of terminals and network characteristics;

wherein the characteristics of a particular terminal includes at least one of: a connection duration of the particular terminal to the video call session and a popularity corresponding to a user of the particular terminal;
in response to a result of the analysis, determine respective qualities of videos to be transmitted to each of the selected terminals during the one video call session,
wherein the quality of each video to be transmitted is determined independently for each of the plurality of terminals; and
transmit, by the server to each of the plurality of terminals, the videos to be transmitted, wherein videos to be transmitted to a first terminal are transmitted at a determined quality for the first terminal and videos to be transmitted to a second terminal are transmitted at a determined quality for the second terminal.

7. The server of claim 6, wherein the first and second terminals are guest terminals other than the host terminal.

8. The server of claim 6, wherein, when a bandwidth of a network in which the video call session is provided is less than a value corresponding to a number of terminals connected to the video call session, and
wherein the processor is further configured to determine the quality of the video based on at least one of the popularity corresponding to a user of the particular terminal and the connection duration of a video call.

9. The server of claim 6, wherein the processor is further configured to:
predetermine quality for one or more videos to be transmitted before the processor determines the quality independently for the remaining videos to be transmitted.

10. A plurality of terminals for a video call mediation comprising:
at least one counterpart terminals,
wherein each of the at least one counterpart terminals is a guest terminal comprising a processor, the processor configured to transmit a video corresponding to each camera on each of the at least one counterpart terminals to a server, and
a host terminal comprising a processor configured to:
transmit a video call mediation request to the server;
establish one video call session with the at least one counterpart terminals through the server;
transmit a video corresponding to each camera on the host terminal to the server,
receive, through the server, a plurality of videos of varying qualities obtained from each of the at least one counterpart terminal;
analyze, using the server, characteristics of each of the plurality of terminals and network characteristics;
wherein the characteristics of a particular terminal includes at least one of:
a connection duration of the particular terminal to the video call session and a popularity corresponding to a user of the particular terminal;
in response to a result of the analysis, determine a quality of each of the plurality of videos; and
transmit, by the server to each of the plurality of terminals, the videos to be transmitted, wherein videos to be transmitted to a first terminal are transmitted at a determined quality for the first terminal and videos to be transmitted to a second terminal are transmitted at a determined quality for the second terminal.

11. The terminal of claim 10, wherein the terminal further comprises a display device, and
wherein the video received from each of the at least one counterpart terminal is displayed in an area corresponding to each counterpart terminal through the display device.

12. The video call mediation method of claim 4, wherein the guest terminal includes a first guest terminal and a second guest terminal,
wherein the quality is determined for each video to be transmitted by the server to the first and second guest terminals in determining respective qualities of videos, and
wherein the video obtained from the host terminal and the videos obtained from the first and second guest terminals are used to determine quality of the videos to be transmitted to the host terminal and the first and second guest terminals.

* * * * *